United States Patent
Cantwell

[19]

[11] Patent Number: 5,917,827
[45] Date of Patent: Jun. 29, 1999

[54] MULTIPLE RATE NETWORK INTERFACE AND METHOD

[75] Inventor: Robert W. Cantwell, Garland, Tex.

[73] Assignee: Alcatel USA Sourcing, L.P., Plano, Tex.

[21] Appl. No.: 08/759,944

[22] Filed: Dec. 3, 1996

Related U.S. Application Data

[60] Provisional application No. 60/019,415, May 15, 1996.

[51] Int. Cl.$^6$ ........................................................ H04J 3/16
[52] U.S. Cl. ............................ 370/466; 370/401; 370/402
[58] Field of Search ..................................... 370/465, 466,
370/467, 545, 401, 402, 403, 404, 405,
406, 407, 408, 217, 218, 200.6, 181, 182.01,
182.02, 359, 419

[56] References Cited

U.S. PATENT DOCUMENTS

| | | | |
|---|---|---|---|
| 4,677,611 | 6/1987 | Yanosy et al. . | |
| 4,866,703 | 9/1989 | Black et al. | 370/60 |
| 5,014,261 | 5/1991 | Shinbashi et al. . | |
| 5,058,156 | 10/1991 | Dietze | 380/9 |
| 5,335,105 | 8/1994 | Carlton | 359/135 |
| 5,436,890 | 7/1995 | Read et al. | 370/58.2 |
| 5,511,075 | 4/1996 | Bhasker | 370/85.13 |
| 5,581,558 | 12/1996 | Horney, II et al. | 370/401 |
| 5,675,580 | 10/1997 | Lyon et al. . | |

*Primary Examiner*—Chi H. Pham
*Assistant Examiner*—Afsar Qureshi
*Attorney, Agent, or Firm*—Baker & Botts, L.L.P.

[57] ABSTRACT

A multiple rate network interface (42) is provided to interface a telecommunication network and a digital telecommunication switch (48). The multiple rate network interface (42) may operate in at least a first mode and a second mode. The first mode allows telecommunication signals in a first format to be exchanged between a telecommunication network and the digital telecommunication switch (48). The second mode allows telecommunication signals in a second format to be exchanged between a telecommunication network and the digital telecommunication switch (48). The first format may be synchronous transport protocol level one (STS-1) and the second format may be digital signal level three (DS3). The multiple rate network interface (42) includes a first processing circuit, a second processing circuit, and a control circuit. The first processing circuit may include a bipolar interface (60), an STS-1 terminator (64), a signal switching circuitry (70), a VT 1.5 terminator (66), and a payload processor (68). The second processing circuit may include the bipolar interface (60), the signal switching circuitry (70), and an M13 multiplexer (62). The control circuit may be implemented using a microprocessor and programmable logic devices.

21 Claims, 4 Drawing Sheets

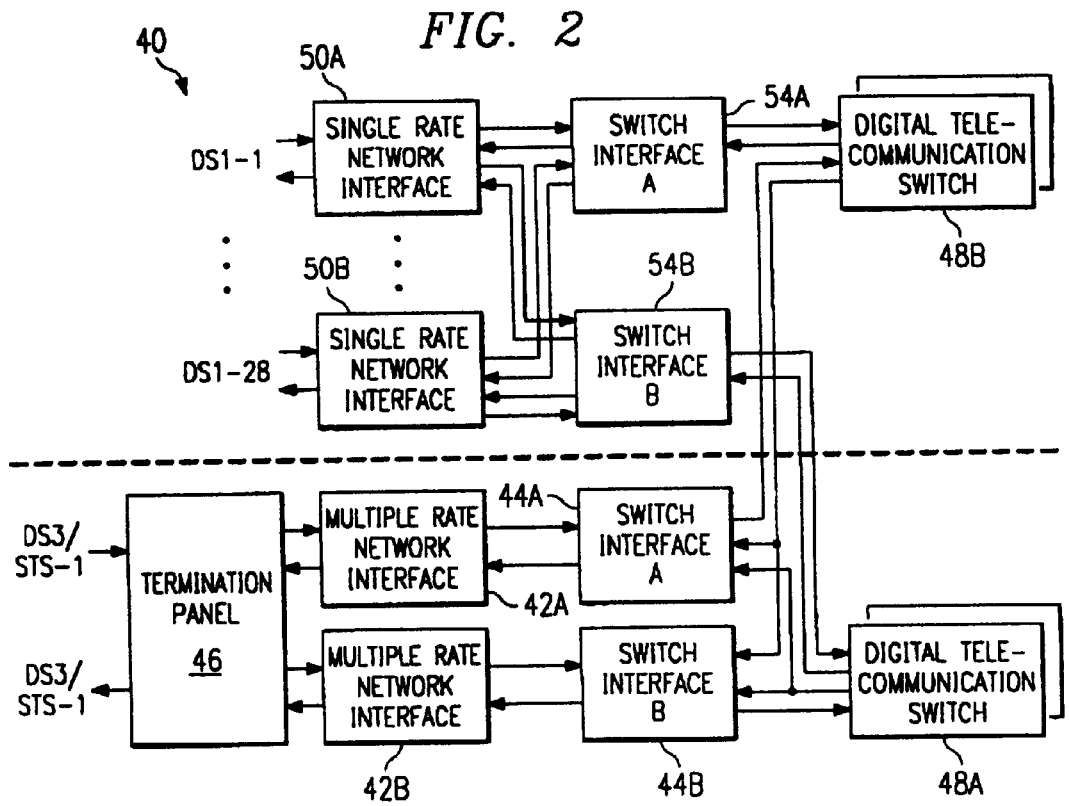
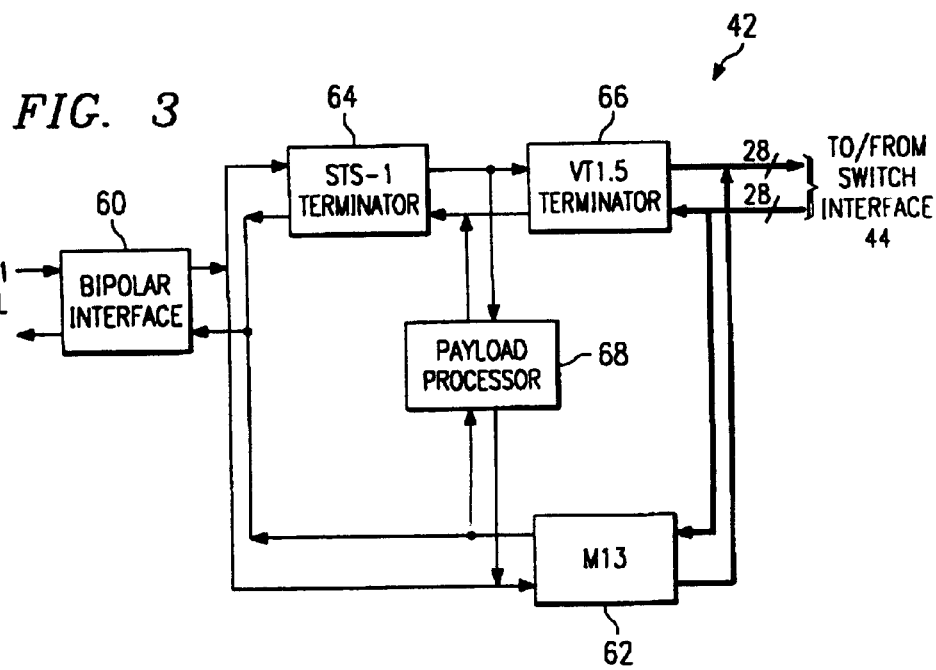

MULTIPLE RATE NETWORK INTERFACE AND METHOD

RELATED PATENT APPLICATION

This application claims the benefit of U.S. Provisional Application No. 60/019,415, filed on May 15, 1996 and entitled "Multiple Rate Network Interface and Method."

TECHNICAL FIELD OF THE INVENTION

This invention relates generally to the field of telecommunications and more particularly to a multiple rate network interface and method for interfacing a network and a telecommunication switch.

BACKGROUND OF THE INVENTION

The importance of telecommunications continues to grow as the information demands of business and society continues to grow. In meeting these demands, telecommunication technology continues to expand and improve so that more advanced telecommunication services can be provided. These advanced telecommunication services require high bandwidth telecommunication networks so that audio, video, and data may be provided.

To meet these demands, telecommunication providers are turning more and more to fiber optic technology. A fiber optic based telecommunication network provides higher bandwidth at less cost than comparable copper-wire based networks. However, the conversion from copper-wire based networks to fiber optic networks is expensive and time consuming. Telecommunication providers are converting their telecommunication networks to fiber optic based networks in various phases over a number of years. Compatibility problems often arise during the interim of these conversions.

One such compatibility problem involves the switching of digital signals between fiber optic based networks and copper-wire based networks. The fiber optic based networks and copper-wire based networks normally provide digital signals in different formats and at different rates. The fiber optic based networks may provide a digital signal to the switching equipment in synchronous optical network (SONET) format such as synchronous transport signal level one (STS-1) format. The copper-wire based networks often provide digital signals in digital signal level one (DS1) format.

The switching equipment used to interface these networks is expensive and often inflexible. In some cases, the switching equipment is capable of handling only a limited number of SONET formatted signals from fiber optic based networks. In other switches, expensive interface cards must be purchased to handle the signals provided by the fiber optic based networks. As networks transition from copper-wire based networks to fiber optic based networks, switching equipment must often be replaced or updated because of the need to handle signals in different formats. These replacements and updates are often very expensive.

SUMMARY OF THE INVENTION

From the foregoing it may be appreciated that a need has arisen for a multiple rate network interface and method for interfacing a network and a telecommunication switch that allows communication signals provided at different rates and formats to be received and exchanged. In accordance with the present invention, there is provided a multiple rate network interface and method that substantially eliminate and reduce the disadvantages and problems discussed above.

According to an embodiment of the present invention, a multiple rate network interface is provided that includes a first processing circuit, a second processing circuit, and a control circuit. The first processing circuit receives and converts a telecommunication signal in a first format, such as synchronous transport signal level one format, to a third format, such as digital signal level one format, when the interface is in a first mode. The second processing circuit receives and converts a telecommunication signal in a second format, such as digital signal level three, to a third format, such as digital signal level one, when the interface is in a second mode. The control circuit controls the switching and operation of the multiple rate network interface and configures the interface to operate in the first mode or the second mode.

According to another embodiment of the present invention, a multiple rate network interface is provided that includes a third processing circuit and a fourth processing circuit, in addition to the first processing circuit and the second processing circuit described above, to provide redundant interface circuitry for improved reliability. The third processing circuit receives and converts the telecommunication signal in the first format to the third format when the interface is in the first mode and serves as a backup or redundant processing circuit to the first processing circuit during the first mode. The fourth processing circuit receives and converts the telecommunication signal in the second format to the third format when the interface is in the second mode and serves as a backup or redundant processing circuit to the second processing circuit during the second mode. This embodiment of the present invention allows redundant multiple network interfaces to be connected for the purpose of improved reliability.

The present invention provides various technical advantages. One technical advantage of the present invention includes the ability to interface signals in different formats with a telecommunication switch without having to replace or upgrade existing switching equipment. Another technical advantage of the present invention includes the ability to operate a telecommunication switch during the time that the associated telecommunication networks are being upgraded from copper-wire based networks to fiber-optic based networks. Yet another technical advantage of the present invention includes redundant multiple network interfaces that improve overall system reliability. The redundant multiple network interfaces include redundant network, control, and timing circuitry that provide the technical advantage of protecting the network interface in the event of a component failure in one network interface. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 2 is an overview block diagram illustrating a system that includes redundant multiple rate network interfaces and single rate network interfaces coupled to redundant digital telecommunication switches;

FIG. 3 is an overview block diagram illustrating the multiple rate network interface;

DETAILED DESCRIPTION OF THE INVENTION

Figure 1:
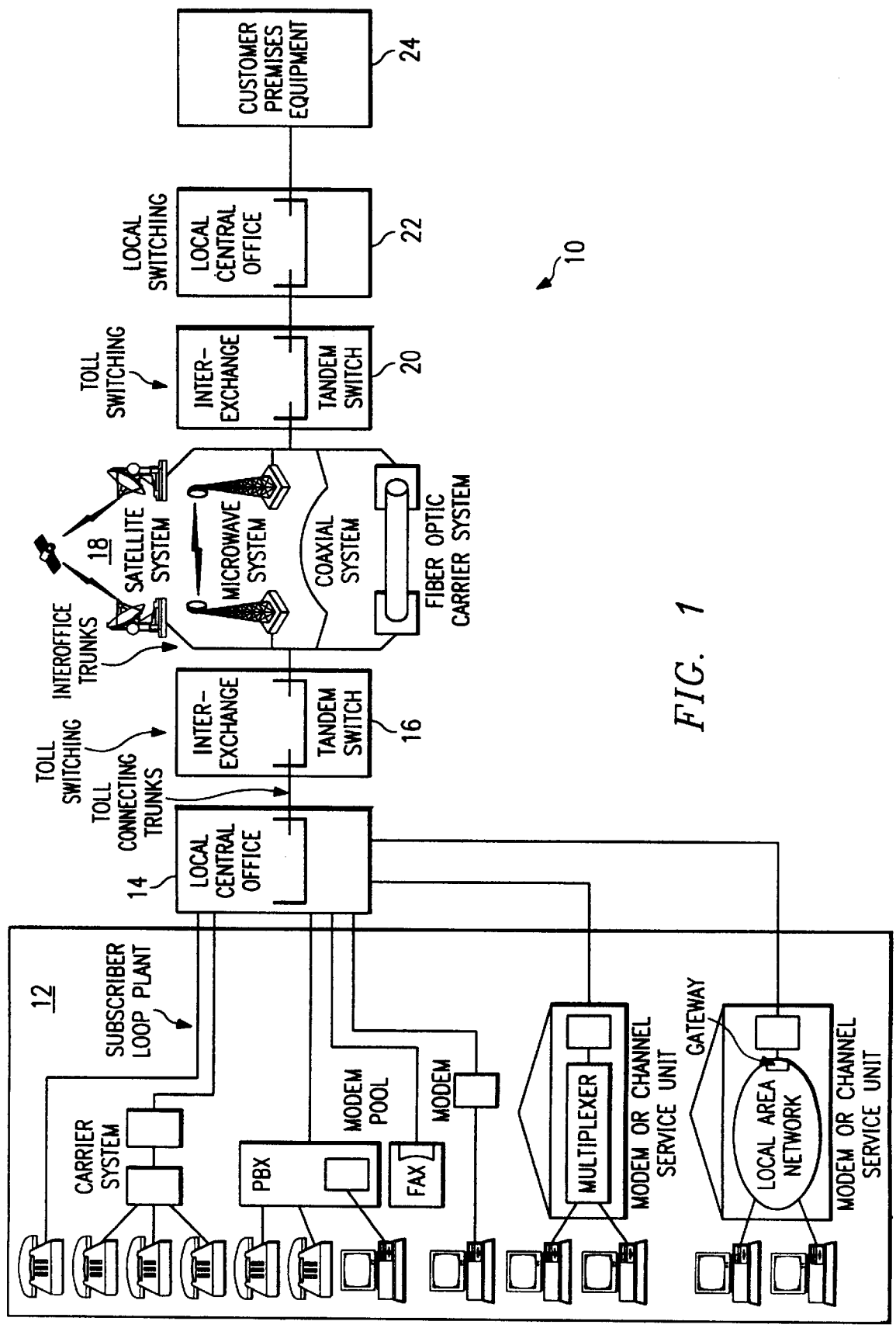
FIG. 1 is an overview diagram illustrating a telecommunication network.

FIG. 1 is an overview diagram of telecommunication system 10. Telecommunication system 10 allows users or subscribers to exchange any of a variety of information including such things as data, audio, video, voice, and image information. Generally, telecommunication system 10 may be described according to various functional blocks. These functional blocks include such things as customer premises equipment, local loops, switching systems, and interoffice trunks. Telecommunication system 10 includes first customer premises equipment 12, first local central office 14, first inter-exchange tandem switch 16, interoffice trunks 18, second inter-exchange tandem switch 20, second local central office 22, and second customer premises equipment 24.

First customer premises equipment 12 and second customer premises equipment 24 include any equipment that is owned and maintained by the user. First customer premises equipment 12 provides examples of several types of customer premises equipment that may be provided at either first customer premises equipment 12 or second customer premises equipment 24. These include standard telephone sets, telephone sets coupled to a carrier system, a private branch exchange (PBX) that provides both voice and data communication signals, a facsimile machine, a computer coupled to a modem, a plurality of computers coupled to a multiplexer which is coupled to a modem, and a local area network having a gateway. All of the various customer premises equipment are coupled to a central office through a local subscriber loop. First customer premises equipment 12 couples to first local central office 14, and second customer premises equipment 24 couples to second local central office 22 through a local subscriber loop.

First local central office 14 and second local central office 22 receive telecommunication signals from their respective customer premises equipment and provide switching functions so that the signals may be properly routed. The telecommunication signals may be routed to other local central offices, not shown in FIG. 1, that are coupled to the local central office, or to a remote local central office through an inter-exchange tandem switch.

First local central office 14 and second local central office 22 may employ any of a variety of switching technology such as space switching and time switching. Some examples of time switches include digital cross-connect switches and cell switches. Space switches include those switches that provide a physical connection such as time multiplexed, step, crossbar, relay, and transistor switches. The telecommunication signals provided to the switches of first local central office 14 and second local central office 22 may be provided in a variety of formats and at a variety of rates.

First local central office 14 couples with first inter-exchange tandem switch 16 so that telecommunication signals may be exchanged through toll connecting trunks. Second local central office 22 couples with second inter-exchange tandem switch 20 through toll connecting trunks so that telecommunication signals may be exchanged. First inter-exchange tandem switch 16 and second inter-exchange tandem switch 20 also include switching systems similar to those of first local central office 14 and second local central office 22. First inter-exchange tandem switch 16 and second inter-exchange tandem switch 20 also may couple with other local central offices not shown in FIG. 1.

First inter-exchange tandem switch 16 and second inter-exchange tandem switch 20 both couple to interoffice trunks 18 so that telecommunication signals may be properly routed to other inter-exchange tandem switches. The transmission paths used by interoffice trunks 18 may include any of a variety of transmission technologies such as satellite systems, microwave systems, coaxial systems and fiber optic systems.

Any of a variety of transmission technologies may be used throughout telecommunication system 10. For example, the subscriber local loop coupling first customer premises equipment 12 and first local central office 14 may include a copper-wire based twisted pair or a fiber optic based cable. The same also applies to the toll connecting trunks and the interoffice trunks shown in FIG. 1. As the different transmission technologies and media are upgraded, the switching equipment located in first local central office 14, second local central office 22, first inter-exchange tandem switch 16, and second inter-exchange tandem switch 20 must be modified to work with the updated transmission technology.

Often, a switch will receive different types of signals at different rates from the different transmission technologies. For example, first local central office 14 may be coupled to first customer premises equipment 12 through a copper-wire based local loop and to other customer premises equipment, not shown in FIG. 1, through a fiber optic based local loop. The switching equipment within first local central office 14 must be capable of interfacing with the different transmission technologies that provide telecommunication signals in different formats and at different rates.

FIG. 2 is an overview block diagram illustrating a system 40 that includes redundant multiple rate network interfaces 42A and 42B and single rate network interfaces 50A and 50B coupled to redundant digital telecommunication switches 48A and 48B. In general, FIG. 2 illustrates the architectural position of redundant multiple rate network interfaces 42A and 42B and the data flows through system 40. Single rate network interfaces 50A and 50B, shown above the dotted horizontal line, and redundant multiple rate network interfaces 42A and 42B are each coupled to redundant digital telecommunication switches 48A and 48B through switch interfaces.

Digital telecommunication switch 48A and digital telecommunication switch 48B are redundant, identical telecommunication switches. For example, either digital telecommunication switch 48A or digital telecommunication switch 48B may operate as the primary switch while the remaining switch serves as the backup. If the primary switch becomes inoperable or undergoes maintenance, the backup or redundant switch will become the primary switch resulting in minimal interruption. This redundancy ensures greater overall telecommunication switch reliability.

A plurality of single rate network interfaces, such as single rate network interface 50A and 50B, interface with a first network to exchange digital signals. Each of the plurality of single rate network interfaces exchange a digital signal in digital signal level one (DS1) format with the first network and a switch interface, such as switch interface 54A and 54B. Switch interface 54A and 54B are redundant switch interfaces that receive the signal in DS1 format and convert it to digital signal level zero (DS0) format. Switch interface 54A and 54B then provide the DS0 signal in DS0 format to digital telecommunication switch 48A and 48B for routing and switching.

Termination panel 46 provides a termination point between a second network and multiple rate network interface 42A and 42B. Termination panel 46 receives a telecommunication signal from the second network in either DS3 format or STS-1 format. Termination panel 46 provides the telecommunication signal to multiple rate network interface 42A and 42B. Termination panel 46 may include a panel having coaxial connectors and cables which split the signal so that each multiple rate network interface may receive the same signal. Multiple rate network interface 42A and 42B may be configured, either through software or with hardware, to operate as a DS3 network interface or as an STS-1 network interface. Multiple rate network interface 42A and 42B are redundant network interfaces that each operate simultaneously with one operating as the primary and the other as the secondary. If the primary network interface fails or becomes inoperable, the secondary network interface will become primary with minimal or no interruption. Thus, multiple rate network interface 42A and 42B are redundant network interfaces that will be configured identically to receive either a DS3 signal or an STS-1 signal based on the type of signal provided from the second network. As the second network is upgraded from a copper-wire based network to a fiber optic based network, the telecommunication signal provided from the second network may then be provided as an STS-1 signal. In such a case, multiple rate network interface 42A and 42B will be configured to receive and process an STS-1 formatted signal.

Multiple rate network interface 42A and 42B receive the digital signal from termination panel 46 and convert the signal to DS1 format. The DS1 signal is then provided to switch interface 44A and 44B which, like switch interface 54A and 54B described above, convert the signal from DS1 format to DS0 format and provides a DS0 signal to digital telecommunication switch 48A and 48B.

Up to this point, FIG. 2 has been described with reference to telecommunication signals being provided from either the first network or second network. These are referred to as inbound telecommunication signals. In contrast, those signals provided from digital telecommunication switch 48A and 48B may be referred to as outbound telecommunication signals. Outbound telecommunication signals are processed the same as inbound signals except in reverse.

Digital telecommunication switch 48A and 48B provide outbound telecommunication signals in DS0 format to the various switch interfaces shown in FIG. 2. For example, digital telecommunication switch 48A may provide an outbound telecommunication signal in DS0 format to switch interface 44B. Switch interface 44B converts the signal from DS0 format to DS1 format and provides the DS1 signal to multiple rate interface 42B. Depending on how multiple rate network interface 42B is configured, multiple rate network interface 42B may convert the telecommunication signal from DS1 format to STS-1 format or from DS1 format to DS3 format. This outbound telecommunication signal is then provided to termination panel 46 and then to the second network.

Figure 4A:
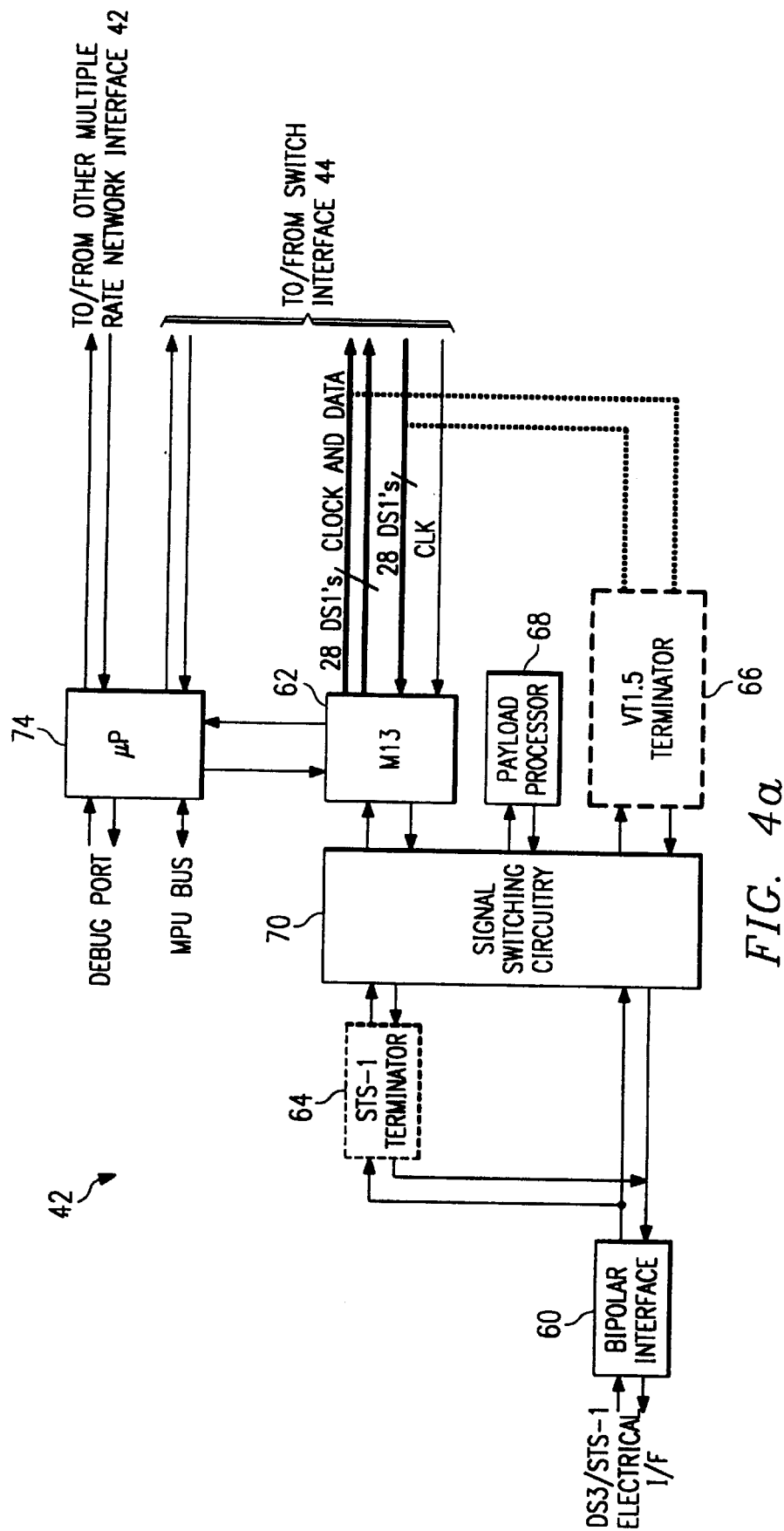
FIG. 4a is an expanded diagram illustrating the multiple rate network interface operating in digital signal level three mode.
Figure 4B:
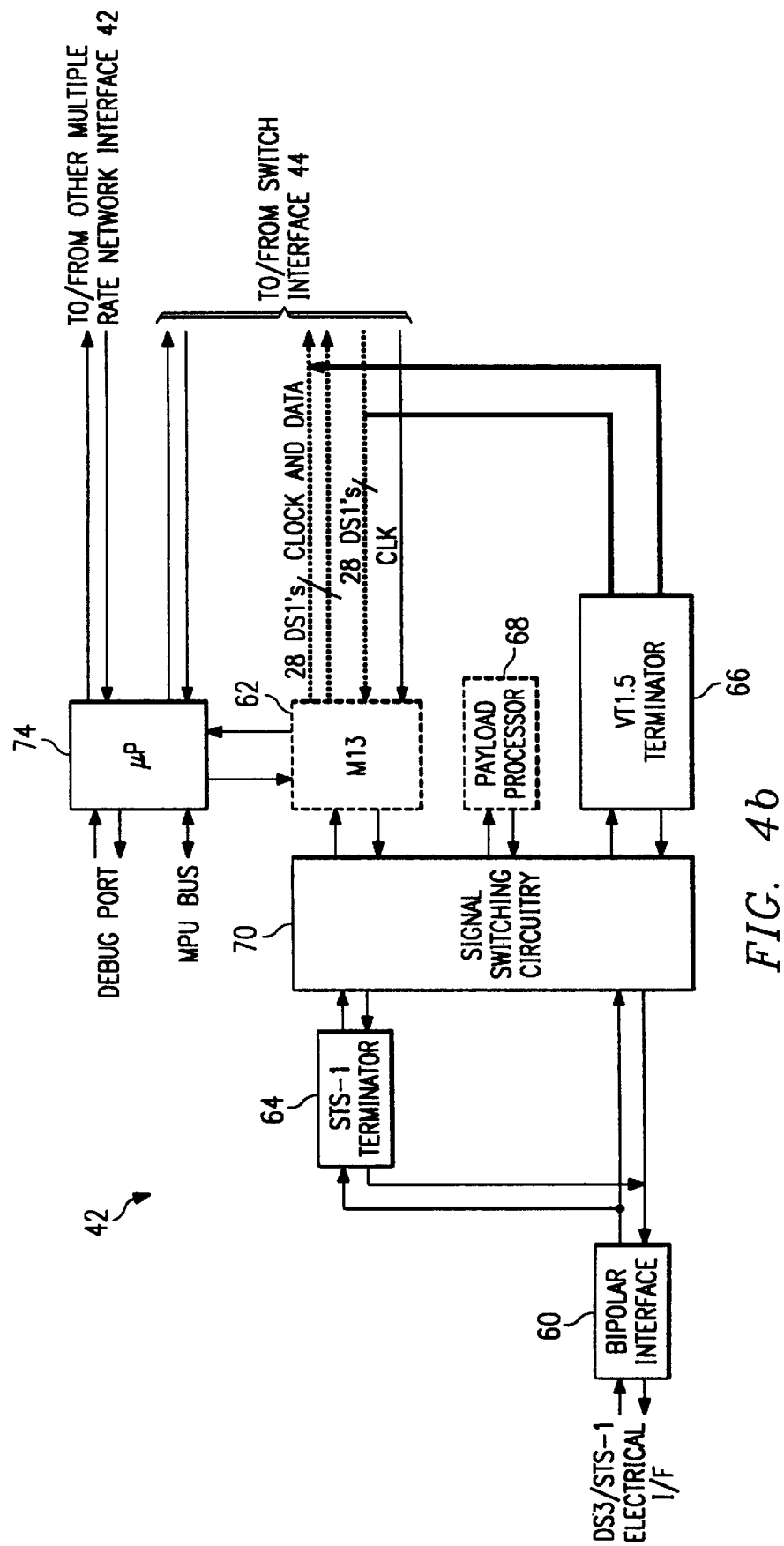
FIG. 4b is an expanded diagram illustrating the multiple rate network interface operating in STS-1 mode.

FIG. 3 is an overview block diagram of multiple rate network interface 42. Multiple rate network interface 42, illustrated in FIG. 2 as multiple rate network interface 42a and 42b, provides an interface between a network and a switch interface. Multiple rate network interface 42 includes a bipolar interface 60, an M13 multiplexer (M13) 62, an STS-1 terminator 64, a VT 1.5 terminator 66, and a payload processor 68. Multiple rate network interface 42 may be configured to operate in different modes for processing either STS-1 formatted telecommunication signals or DS3 formatted telecommunication signals. Multiple rate network interface 42 may be software configured or hardware configured to operate in a DS3 mode or an STS-1 mode. Control circuitry, including a microprocessor and described more fully below with respect to FIGS. 4a and 4b, is used to configure multiple rate network interface 42 into either DS3 mode or STS-1 mode.

When multiple rate network interface 42 operates in DS3 mode, bipolar interface 60 receives an inbound telecommunication signal from a network through an electrical interface. The inbound telecommunication signal is provided in DS3 format. Bipolar interface 60 receives the inbound DS3 signal and decodes the signal to a bipolar analog DS3 signal from a dual-rail bipolar three zero substitution (B3ZS) encoded digital signal. The inbound DS3 signal is then provided to M13 62 and converted from DS3 format to DS1 format. M13 62 is a multiplexer that can convert a DS1 signal to a DS3 signal, and a DS3 signal to a DS1 signal. M13 62 may be a TRANSWITCH multiplexer. There are twenty-eight DS1 signals in one DS3 signal. The twenty-eight DS1 signals are then provided to switch interface 44.

When outbound signals are provided to multiple rate network interface 42, while multiple rate network interface 42 is operating in DS3 mode, switch interface 44 provides an outbound telecommunication signal in DS1 format. Twenty-eight DS1 signals are provided to M13 62 and converted from DS1 format to DS3 format. The DS3 signal is then encoded and provided through bipolar interface 60 to the network in DS3 format.

When multiple rate network interface 42 is configured to operate in STS-1 mode, an inbound telecommunication signal is provided from the network to bipolar interface 60 in STS-1 format and is decoded. Bipolar interface 60 provides the STS-1 signal to STS-1 terminator 64. STS-1 terminator 64 processes the signal by removing section and line overhead. STS-1 terminator 64 monitors the path overhead and the synchronous payload envelope (SPE) is located. The SPE is extracted and remapped into another signal. This signal is then provided to VT 1.5 terminator 66.

VT 1.5 terminator 66 receives the signal containing the SPE and extracts virtual tributary 1.5 (VT 1.5) signals from the SPE. The VT 1.5 signals are then converted to equivalent DS1 signals and provided to switch interface 44 as twenty-eight DS1 signals.

When multiple rate network interface 42 is configured in STS-1 mode and outbound telecommunication signals are received from switch interface 44, VT 1.5 terminator 66 receives twenty-eight DS1 signals and converts each of them to corresponding VT 1.5 signals. The VT 1.5 signals are combined into an SPE. The SPE is then provided to STS-1 terminator 64.

STS-1 terminator 64 receives the SPE and assembles an STS-1 signal by adding various overhead such as section and line overhead. The STS-1 outbound telecommunication signal is then provided to bipolar interface 60 and then to the network.

Multiple rate network interface 42 may also be configured to operate in another mode that may be referred to as "STS-1 with DS3 payload" mode. In this mode, inbound telecommunication signals are received from the network in STS-1 format. The STS-1 signal contains an SPE containing a DS3 signal. The STS-1 signal with a DS3 payload is then provided to STS-1 terminator 64 which removes section and line overhead and extracts the SPE containing the DS3 signal. The SPE is then provided to payload processor 68 where the SPE with a DS3 payload is converted to a DS3 signal. Payload processor 68 provides the DS3 signal to M13 62 where the DS3 signal is converted from a DS3 signal to twenty-eight DS1 signals which are then provided to switch interface 44.

When an outbound signal is received from switch interface 44 and multiple rate network interface 42 is operating in STS-1 with DS3 payload mode, M13 62 receives twenty-eight DS1 signals and converts them to a corresponding DS3 signal. The DS3 signal is provided to payload processor 68 where the DS3 signal is converted into an STS-1 SPE containing the DS3 signal. The SPE is then provided to STS-1 terminator 64 where a corresponding STS-1 signal is created by adding various overhead such as section and line overhead. The STS-1 outbound signal is then provided to bipolar interface 60, where it is encoded, and then provided to the network.

Control circuitry, not shown in FIG. 3, is used in multiple rate network interface 42 to provide various control, timing, and configuration functions. The control circuitry may include various programmable logic devices and microprocessors used to perform these functions. For example, the control circuitry could be implemented using microprocessor 74 as discussed below and as illustrated in FIGS. 4a and 4b.

FIG. 4a is an expanded diagram illustrating multiple rate network interface 42 operating in DS3 mode. Multiple rate network interface 42, while operating in DS3 mode, may receive inbound telecommunication signals in DS3 format and provide corresponding DS1 signals to switch interface 44. Multiple rate network interface 42 may also receive outbound telecommunication signals from switch interface 44 in DS1 format and provide a corresponding DS3 signal to a network through bipolar interface 60.

Referring now to inbound signals, bipolar interface 60 receives a DS3 signal from the network through an electrical interface. Bipolar interface 60 decodes the B3ZS encoded DS3 signal to a bipolar analog DS3 signal. The bipolar analog DS3 signal is provided to a signal switching circuitry 70. Signal switching circuitry 70 provides the bipolar analog DS3 signal to M13 62. M13 62 converts the DS3 signal to twenty-eight corresponding DS1 signals. M13 62 then provides the twenty-eight DS1 signals to switch interface 44. In doing so, M13 62 provides a corresponding timing or clock signal for each of the individual twenty-eight DS1 telecommunication signals.

Throughout this operation, a microprocessor 74 monitors and controls the operation of multiple rate network interface 42. Microprocessor 74 couples with a microprocessor unit (MPU) address and data bus and also provides a debug port so that the operation of multiple rate network interface 42 may be monitored. Microprocessor 74 is in communication with redundant multiple rate network interfaces, such as multiple rate network interface 42A and 42B shown and described in FIG. 2, so that the redundant interfaces are in communication with one another and may swap between primary and backup as needed. Microprocessor 74 may be a MOTOROLA microprocessor.

Multiple rate network interface 42, while in DS3 mode, receives outbound telecommunication signals from switch interface 44. The outbound telecommunication signals are received as twenty-eight DS1 formatted signals and a clock signal. M13 62 receives the twenty-eight DSls and a corresponding clock signal and generates a corresponding DS3 signal which is provided to signal switching circuitry 70. Signal switching circuitry 70 provides the DS3 signal to bipolar interface 60. Bipolar interface 60 encodes the outbound DS3 signal and provides it to the network through an electrical interface.

During DS3 mode, STS-1 terminator 64 and VT 1.5 terminator 66 are generally inactive and thus are illustrated in FIG. 4a with dotted lines. Payload processor 68 is also generally inactive during DS3 mode but may be active in STS-1 with DS3 payload.

FIG. 4A may also be used to illustrate the operation of multiple rate network interface 42 in STS-1 with DS3 payload mode. This occurs when an STS-1 signal is provided from a network that includes in its SPE a DS3 signal. In such a case, bipolar interface 60 receives the inbound STS-1 signal from the electrical interface. Bipolar interface 60 decodes the inbound STS-1 signal and generates a corresponding bipolar analog STS-1 signal. STS-1 terminator 64 receives the bipolar STS-1 analog signal and removes section and line overhead and locates the SPE, which in this case contains a DS3. Signal switching circuitry 70 receives the SPE containing the DS3 and provides this signal to payload processor 68.

Payload processor 68 further processes the SPE and generates a corresponding DS3 signal which is then provided to M13 62. M13 62, operating as it does in DS3 mode, provides twenty-eight DS1 signals and corresponding clocks to switch interface 44.

Multiple rate network interface 42, while operating in STS-1 with DS3 payload mode, receives outbound telecommunication signals from switch interface 44. The outbound signals are provided as twenty-eight DS1 signals with one clock or timing signal provided for all twenty-eight DS1s. M13 62 receives the twenty-eight DSls and corresponding clock signal and converts or multiplexes the signals into a corresponding DS3 signal which is then provided to signal switching circuitry 70. Signal switching circuitry 70 provides the DS3 signal to payload processor 68 which converts the DS3 signal into an STS-1 SPE containing the DS3. This signal is then provided back to signal switching circuitry 70.

Signal switching circuitry 70 then provides the signal to STS-1 terminator 64 where STS-1 overhead, such as section and line overhead, is added to the STS-1 SPE containing the DS3 to generate an outbound STS-1 telecommunication signal. STS-1 terminator 64 provides the outbound STS-1 telecommunication signal to bipolar interface 60 which encodes the signal and provides it to the network.

FIG. 4B is an expanded diagram, similar to FIG. 4a, illustrating multiple rate network interface 42 operating in STS-1 mode. Multiple rate network interface 42, while operating in STS-1 mode, may receive inbound telecommunication signals in STS-1 format and provide corresponding DS1 signals to switch interface 44. Multiple rate network interface 42 may also receive outbound telecommunication signals from switch interface 44 in DS1 format and provide a corresponding STS-1 signal to a network through bipolar interface 60. During STS-1 mode, M13 62 and payload processor 68 are generally inactive and thus are depicted in FIG. 4b with dotted lines.

Multiple rate network interface 42 receives inbound telecommunication signals in STS-1 format through an electrical interface coupled to a network. Bipolar interface 60 decodes the B3ZS encoded STS-1 signal to a corresponding bipolar analog STS-1 signal. The signal is then provided to STS-1 terminator 64 which removes section and line overhead from the STS-1 signal and extracts the SPE from the STS-1. The SPE is then provided to signal switching circuitry 70.

Signal switching circuitry 70 receives the signal containing the SPE and provides the signal to VT 1.5 terminator 66. VT 1.5 terminator 66 isolates twenty-eight individual VT 1.5's from the SPE and converts them into twenty-eight corresponding DS1's. These twenty-eight DS1's and a corresponding clock signal for each DS1 is provided to switch interface 44.

Multiple rate network interface 42, while operating in STS-1 mode, receives outbound telecommunication signals from switch interface 44. Switch interface 44 provides the outbound telecommunication signals as twenty-eight DS1's and a clock signal.

VT 1.5 terminator 66 receives these twenty-eight DS1 outbound signals and converts each of them to a corresponding VT 1.5 signal. VT 1.5 terminator 66 then assembles the VT 1.5 signals into an STS-1 SPE and provides this to signal switching circuitry 70.

Signal switching circuitry 70 provides the STS SPE to STS-1 terminator 64. STS-1 terminator 64 generates a corresponding STS-1 signal by inserting appropriate overhead such as section and line overhead. STS-1 terminator 64 then provides the STS-1 outbound signal to bipolar interface 60. Bipolar interface 60 encodes the STS-1 signal and provides the outbound STS-1 signal to the network through an electrical interface. Thus, FIG. 4b illustrates multiple rate network interface 42 operating in STS-1 mode and functioning as an STS-1 network interface.

Bipolar interface 60, STS-1 terminator 64, signal switching circuitry 70, VT 1.5 terminator 66, and payload processor 68 may be referred to as a first processing circuit. Bipolar interface 60, signal switching circuitry 70, and M13 multiplexer 62 may be referred to as the second processing circuit.

Thus, it is apparent that there has been provided, in accordance with the present invention, a multiple rate network interface and method for interfacing a network and a telecommunication switch that satisfies the advantages set forth above. Although the present invention has been described in detail, it should be understood that various changes, substitutions, and alterations can be made herein. For example, many of the various devices and circuits of the present invention may be implemented as integrated circuits. Furthermore, the direct connections illustrated herein could be altered by one skilled in the art such that two devices are merely coupled to one another through an intermediate device or devices without being directly connected while still achieving the desired results demonstrated by the present invention. Although the multiple rate network interface and method has been described using DS3 and STS-1 signals, it should be understood that the present invention is in no way limited to these particular formats and rates. Other examples of changes, substitutions, and alterations are readily ascertainable by one skilled in the art and could be made without departing from the spirit and scope of the present invention as defined by the following claims.

What is claimed is:

1. A multiple rate network interface comprising:
   a processing circuit operable to receive an inbound telecommunication signal having either a first or second telecommunications format;
   the processing circuit operable to perform a first conversion of the telecommunication signal received in the first telecommunications format to an internal telecommunications format when in a first mode, the processing circuit operable to perform a second conversion of the inbound telecommunication signal received in the second telecommunications format to the internal telecommunications format when in a second mode; and
   a control circuit operable to configure the processing circuit to operate in either the first mode or the second mode in order to perform either the first or the second conversion, respectively.

2. The multiple rate network interface of claim 1, wherein the processing circuit receives the inbound telecommunication signal from a network.

3. The multiple rate network interface of claim 1, wherein the processing circuit is operable to provide the inbound telecommunication signal in the internal telecommunications format to a telecommunication switch when in the first mode, and the processing circuit is operable to provide the inbound telecommunication signal in the internal telecommunications format to a telecommunication switch when in the second mode.

4. The multiple rate network interface of claim 1, wherein the processing circuit is operable to receive and convert an outbound telecommunication signal in the internal telecommunications format to the first telecommunications format when in the first mode, and the processing circuit is operable to receive and convert the outbound telecommunication signal in the internal telecommunications format to the second telecommunications format when in the second mode.

5. The multiple rate network interface of claim 4, wherein the processing circuit receives the inbound telecommunication signal from a telecommunication network when converting the inbound telecommunication signal to the internal telecommunications format, the processing circuit receives the outbound telecommunication signal from a telecommunication switch when converting the outbound telecommunications signal from the internal telecommunications format to the first telecommunications format, and the processing circuit receives the outbound telecommunication signal from a telecommunication switch when converting the outbound telecommunications signal from the internal telecommunications format to the second telecommunications format.

6. The multiple rate network interface of claim 1, wherein the telecommunication signal is a digital signal.

7. The multiple rate network interface of claim 1, further comprising:
   a redundant processing circuit operable to perform a first conversion of the inbound telecommunication signal received in the first telecommunications format to the internal telecommunications format when in the first mode, the redundant processing circuit operable to operate as a backup to the processing circuit during the first mode the redundant processing circuit operable to receive and convert the inbound telecommunication signal in the second telecommunications format to the internal telecommunications format when in the second mode, the redundant processing circuit operable to operate as a backup to the processing circuit during the second mode.

8. The multiple rate network interface of claim 7, wherein the redundant processing circuit operates simultaneously with the processing circuit during the first mode, and the redundant processing circuit operates simultaneously with the processing circuit during the second mode, and wherein the redundant processing circuit provides a redundant multiple rate network interface.

9. The multiple rate network interface of claim 1, wherein the control circuit is operable to configure the processing circuit through software control.

10. A multiple rate network interface comprising:
a processing circuit operable to receive an inbound telecommunication signal having either a synchronous transport protocol level one format or a digital signal level three format;
the processing circuit operable to perform a first conversion of the inbound telecommunication signal in the synchronous transport protocol level one format to an internal telecommunication signal in a digital signal level one format when in a first mode the processing circuit operable to perform a second conversion of the inbound telecommunication signal in the digital signal level three format to the internal telecommunication signal in the digital signal level one format when in a second mode; and
a control circuit operable to configure the processing circuit to operate in either the first mode or the second mode.

11. The multiple rate network interface of claim 10, wherein the processing circuit is operable to receive and convert an outbound telecommunication signal in the digital signal level one format to the synchronous transport protocol level one format when in the first mode, and the processing circuit is operable to receive and convert the outbound telecommunication signal in the digital signal level one format to the digital signal level three format when in the second mode.

12. The multiple rate network interface of claim 11, wherein the processing circuit receives the inbound telecommunication signal from a telecommunication network when converting the inbound telecommunication signal to the digital signal level one format, the processing circuit receives the outbound telecommunication signal from a telecommunication switch when converting the outbound telecommunication signal from the digital signal level one format to the synchronous transport protocol level one format, and the processing circuit receives the outbound telecommunication signal from the telecommunication switch when converting the outbound telecommunication signal from the digital signal level one format to the digital signal level three format.

13. The multiple rate network interface of claim 12, wherein the processing circuit is operable to receive and convert the inbound telecommunication signal received in the synchronous transport protocol level one format having a payload envelope of a digital signal level three formatted signal to a telecommunication signal in the digital signal level one format when in the first mode, the processing circuit further operable to receive and convert the outbound telecommunication signal in the digital signal level one format to synchronous transport protocol level one format having a payload envelope of a digital signal level three formatted signal when in the first mode.

14. A method for operating a multiple rate network interface, comprising:
receiving an inbound communication signal having either a first or second telecommunications format from a network;
converting the inbound communication signal from the first telecommunications format to an internal telecommunications format when in a first mode of operation; and
converting the inbound communication signal from the second telecommunications format to the internal telecommunications format when in a second mode of operation;
providing the inbound communication signal in the internal telecommunications format to a telecommunication switch.

15. The method of claim 14, wherein the inbound communication signal is the electrical equivalent to an optical communication signal provided from a fiber-optic based network.

16. The method of claim 14 wherein the multiple rate network interface is configured for the first and second modes of operation through software control.

17. The method of claim 14 wherein the first telecommunications format may be a DS3 format and the second telecommunications format may be an STS-1 format.

18. The method of claim 14 wherein the internal telecommunications format is a DS1 format.

19. The method of claim 14 wherein the first telecommunications format may be a SONET defined format and the second telecommunications format may be a synchronous data hierarchy defined format.

20. The method of claim 14 wherein the first telecommunications format is a digital signal format.

21. The method of claim 1 further comprising the steps of:
receiving an outbound communication signal in the internal telecommunications format from the telecommunication switch;
converting the outbound communication signal from the internal telecommunications format to one of the first and second telecommunications formats, the outbound communication signal being converted to the first telecommunications format while in the first mode of operation, the outbound communication signal being converted to the second telecommunications format while in the second mode of operation and
providing the outbound communication signal to the network.

* * * * *